(No Model.)

G. B. CRAPSEY.
SEGMENT SAW.

No. 490,384. Patented Jan. 24, 1893.

Witnesses:-
W. L. Caldwell.
H. S. Johnson.

Inventor:-
George B. Crapsey,
per Paul ⸺
Attorneys.

UNITED STATES PATENT OFFICE.

GEORGE B. CRAPSEY, OF MERRILL, WISCONSIN, ASSIGNOR OF ONE-HALF TO CHARLES CRISTADORO, OF ST. PAUL, MINNESOTA.

SEGMENT-SAW.

SPECIFICATION forming part of Letters Patent No. 490,384, dated January 24, 1893.

Application filed May 9, 1892. Serial No. 432,372. (No model.)

*To all whom it may concern:*

Be it known that I, GEORGE B. CRAPSEY, of Merrill, Lincoln county, Wisconsin, have invented certain Improvements in Segment-Saws, of which the following is a specification.

My invention relates to improvements, in the construction of segment circular saws, designed for the resawing of lumber; its object being to so form the segments that they will not "buckle" or be twisted out of position, by coming in contact with a knot or other obstruction in the lumber. When a saw of this character is formed of sections of a circle, the first teeth of each section are forced into the stock by a thrusting or pushing motion, and consequently the thin sheet metal is liable to bend or buckle, if the teeth encounter a knot or offer more than ordinary resistance.

My invention consists in forming the segments, not as sectors, but with their section lines intersecting at the circumference of a circle concentric with the center of the saw, which circle is of such size that the point adjacent the forward edge of the segment, at which it is secured to the plate or saw head, is forward of a radial line drawn to the point of its first tooth, so that the teeth are carried into the stock by a dragging instead of a thrusting motion.

My invention further consists in the specific construction and combination hereinafter described and particularly pointed out in the claims.

Figure 1:
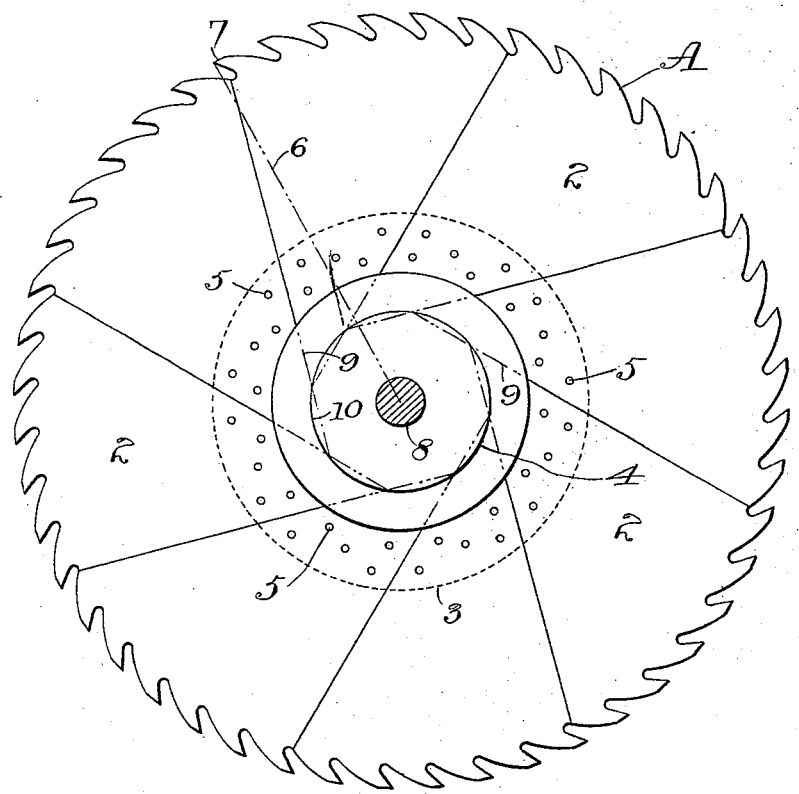
Figure 2:
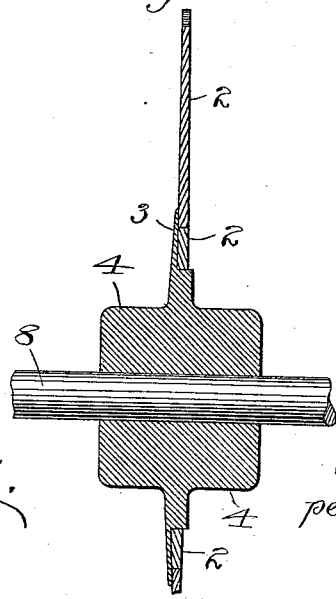

In the accompanying drawings forming part of this specification, Figure 1 is a side elevation of my improved saw showing the lines of the segments, and the points at which they are secured to the saw head, and Fig. 2 is a partial central cross section of the same, showing the manner in which the segments are secured to the saw head.

In the drawings A represents the saw made up of a series of segments 2, the meeting edges or sectional lines of which, would if projected, intersect upon the circumference of a circle 10 concentric with the saw as shown by dot-and-dash lines 9. These sectional lines are such that the point nearest the forward edge of the segment, at which the segment is secured to the flange 3 of the saw head 4, is forward of a radial line 6 drawn to the point of the first tooth of the segment, as shown clearly in Fig. 1, the rivets 5 being a slight distance forward, in the direction of the rotation of the saw, of the dotted line drawn from the point of the first tooth 7 to the axis or center of the shaft 8 of the saw.

In operation, the first teeth of the segment, are dragged into and through the stock, so that the metal cannot spring or buckle, or throw the segment out of line with the adjacent one, or the plane of the saw.

I claim—

1. A circular segment saw having each of its segments secured to the saw head at a point forward of a line drawn from the first tooth of the segment to the center of the saw.

2. A circular segment saw, the projected section lines of which intersect in a circle concentric with said saw.

3. As an improved article of manufacture, blades for segment saws, the forward section edge of each aligning with a point forward of the center of the saw.

In testimony whereof I have hereunto set my hand this 26th day of April, 1892.

GEORGE B. CRAPSEY.

In presence of—
H. R. ALLEN,
C. C. WILLIAMS.